United States Patent [19]

Yates

[11] 4,400,658
[45] Aug. 23, 1983

[54] CABLE JUMPER WITHOUT POLARITY

[75] Inventor: Herbert Yates, Montreal, Canada

[73] Assignee: MYL Developments Ltd., Quebec, Canada

[21] Appl. No.: 393,758

[22] Filed: Jun. 30, 1982

[51] Int. Cl.³ .......................................... H01M 10/46
[52] U.S. Cl. ...................................... 320/26; 307/127
[58] Field of Search ...................... 307/127; 320/2, 25, 320/26

[56] References Cited

U.S. PATENT DOCUMENTS

| | | | |
|---|---|---|---|
| 2,509,239 | 5/1950 | Mattheyses | 320/25 |
| 3,267,301 | 8/1966 | Gignac | 320/25 X |
| 3,413,487 | 11/1968 | Gershen | 320/26 X |
| 3,466,453 | 9/1969 | Greenberg | 320/25 X |
| 4,166,241 | 8/1979 | Grant | 320/25 |
| 4,180,746 | 12/1979 | Giuffra | 320/26 X |
| 4,217,534 | 8/1980 | Cole | 320/25 |
| 4,258,305 | 3/1981 | Angelin | 320/2 |
| 4,272,142 | 6/1981 | Zapf | 320/25 X |
| 4,286,172 | 8/1981 | Millonzi et al. | 320/25 X |
| 4,349,774 | 9/1982 | Farque | 320/25 |

Primary Examiner—William M. Shoop

[57] ABSTRACT

The invention relates to a battery cable jumper arrangement. The arrangement has a first pair of cables and clamps at the connecting ends of each cable of the first pair of cables to connect each cable end to a respective terminal of a source of D.C. power. The arrangement further includes a second pair of cables with clamps at the connecting ends of each cable of the second pair of cables for connecting each cable end to a respective terminal of a battery to be recharged. A first sensor, such as a three-position solenoid, senses the polarity of connection of the first pair of cables at the source of power, while a second sensor, such as a three-position solenoid, senses the polarity of connection of the second pair of cables at the battery. A switching arrangement, for example, an interconnected set of double pole double throw switches, driven by the first and second sensor, are actuated by the sensors to ensure correct polarity of connection between the power source and the battery regardless of the polarity of connection of either the power source or the battery.

7 Claims, 5 Drawing Figures

CABLE JUMPER WITHOUT POLARITY

BACKGROUND OF INVENTION

1. Field of the Invention

The invention relates to a battery jumper cable arrangement. More specifically, the invention relates to such a battery jumper cable arrangement which includes means for automatically providing correct polarity connection between a source of D.C. power and a battery to be recharged.

2. Description of Prior Art

Vehicles using rechargeable batteries, for example, automobiles, buses, trucks, tanks, etc., will often require boosts on their batteries from external sources of D.C. power. When a battery is boosted, it is imperative that the D.C. power source and the battery be connected with the proper polarity. Connecting the booster source to the run down battery with reverse polarities can cause the run down battery to be even further run down and can also damage the power source especially if one automobile is being boosted by a second automobile. In addition, because of the fast discharge arising from an incorrect connection, the high current could melt the insulation on the booster cables and cause an explosion.

This problem of incorrect polarity connection has led to research and development and several solutions have been developed as illustrated in, for example, U.S. Pat. No. 4,166,241, Grant Aug. 28, 1979; U.S. Pat. No. 4,217,534, Cole Aug. 12, 1980; and U.S. Pat. No. 4,258,305, Angelin, Mar. 24, 1981.

The Grant patent simply teaches an arrangement for preventing a spark discharge on a jumper cable arrangement. The Cole patent teaches an arrangement for sensing an incorrect connection and for preventing such incorrect connection and providing an indication of such an incorrect connection. However, the Cole device does not automatically provide a correct connection.

The Angelin patent does teach a device which automatically provides a correct connection. However, the Angelin device must be operated through the cigarette lighters of the vehicles. Thus, it is not useful when the vehicles do not have cigarette lighters as, for example, in tanks. In addition, the Angelin device would not be useful for a booster truck where the connection is made directly from the booster battery to the battery requiring recharging.

SUMMARY OF INVENTION

It is therefore an object of the invention to provide a battery jumper cable arrangement which overcomes the above disadvantages.

It is a more specific object of the invention to provide a battery jumper cable arrangement with means for automatically providing correct polarity connections.

It is an even more specific object of the invention to provide such an arrangement which provides for correct connections by first sensing the polarity of the connection at each end thereof and by then actuating switch means to ensure the correct polarity connection.

In accordance with the invention there is provided a battery cable jumper arrangement having a first pair of cables with means at the connecting ends of each cable of the first pair of cables to connect each cable end to a respective terminal of a source of DC power, and a second pair of cables with means at the connecting ends of each cable of the second pair of cables for connecting each cable end to a respective terminal of a battery to be recharged. The arrangement includes a first means for sensing the polarity of connection of the first pair of cables at the source of power, and a second means for sensing the polarity of connection of the second pair of cables at the battery. Switch means, driven by the first means and the second means, automatically ensure correct polarity of connection between the power source and the battery.

BRIEF DESCRIPTION OF DRAWINGS

Referring to FIG. 1, the arrangement consists of a first cable pair 1,3, the connecting end of each of the cables in the cable pair including one half of a clamp member, 2,4, respectively. A second cable pair 5,7 also has each connecting end of its cable terminated in a half of a clamp member 6,8 respectively.

Figure 1:
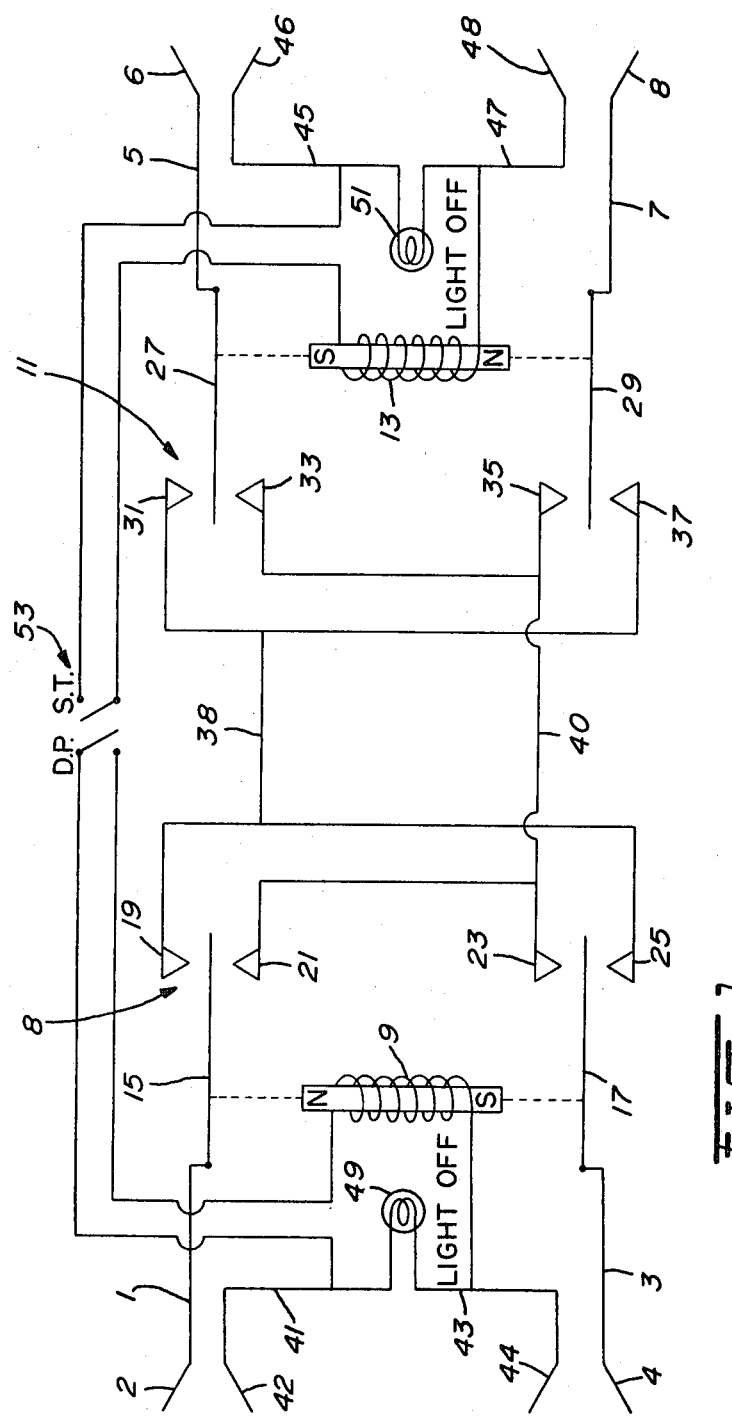
FIG. 1 shows the battery cable arrangement in accordance with the invention.

The other ends of the cable pair 1,3 are connected to a double pole double throw (DPDT) switch 8, the DPDT switch being actuated by three-position solenoid 9. The three-position solenoid is of the type taught in *Handbook of Remote Control & Automation Techniques,* John E. Cunningham, TAB Books, at page 118, lines 2 et seq.

In the same way, the other ends of cable pair 5,7 are connected to DPDT switch 11 which is actuated by three-position solenoid 13.

As can be seen, the DPDT switch 8 includes moveable arms 15 and 17 the moveable arm 15 being connected to the other end of cable 1 and the moveable arm 17 being connected to the other end of cable 3. Moveable arm 15 is disposed between contact pair 19,21 when in an unactuated position and will make contact with either 19 or 21 depending on the polarity of actuation. In the same way, moveable arm 17 is disposed between contact pair 23,25. In a like manner, moveable arm 27, which is connected to the other end of cable 5, is disposed between contact pair 31,33 while moveable arm 19, which is connected to the other end of cable 7, is disposed between contact pair 35,37.

The cables 1, 3, 5 and 7, DPDT switches 8 and 11, and the interconnection between the DPDT switches, consisting of connector means 38 and connector means 40 constitute the primary or charging circuit of the battery jumper cable arrangement in accordance with the invention. As seen, connector 38 connects all the first contacts 19, 25, 31 and 37 together, while connector 40 connects second contacts 21, 23, 33 and 35 together.

Also provided are secondary circuits for actuating the solenoids. The actuating circuit at the left hand side of the arrangement consists of cables 41 and 43 terminating, at their connecting ends, in half clamps 42 and 44 respectively. The two halves of the clamp (2,42 or 4,44) together form a clamp with the terminals insulated from each other. An example of such a clamp will be illustrated below. The other ends of cables 41 and 43 are connected to the actuating terminals of solenoid 9.

At the other end of the arrangement, the actuating circuit consists of the cables 45 and 47 and half clamp members 46 and 48. Again, the cables 45 and 47 are connected, at their connecting ends, to half clamps 46 and 48 respectively and, at their other ends, are connected to the actuating terminals of solenoid 13.

Lights 49 and 51 are connected in parallel with solenoids 9 and 13 respectively to indicate that a connection has been made and that the lights are lit.

Also connected in circuit with the solenoid actuating circuits is double pole single throw (DPST) switch 53. This switch is provided, as will be discussed below, to prevent spark discharge when a battery is being disconnected.

With the arrangement as shown, each solenoid, in effect, senses the polarity of connection at its end and then drives the double pole double throw switch into a position complementary to the position of the double pole double throw switch at the other end for correct polarity connection. The sensing arrangement ensures correct polarity connection at both ends regardless of the polarity connection at either end.

Figure 2:
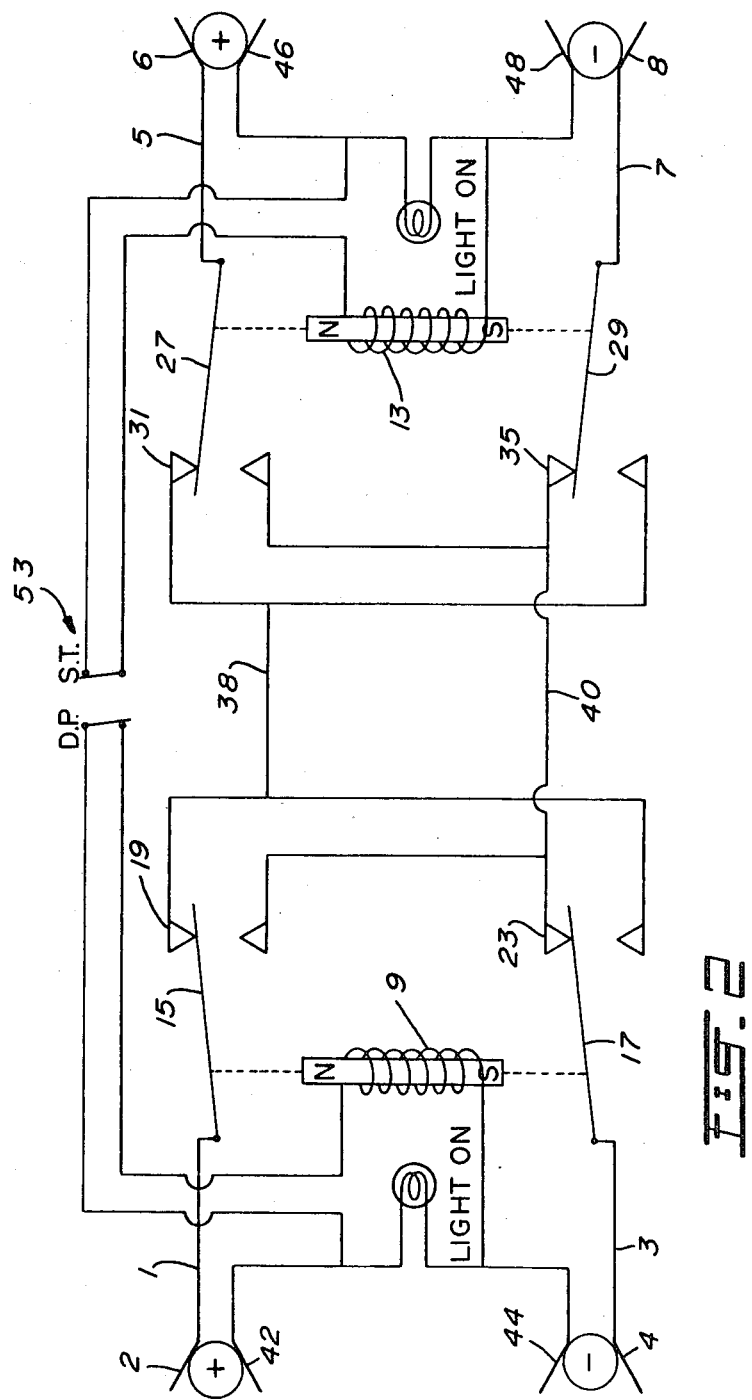
FIG. 2 shows the battery cable arrangement of FIG. 1 with the second battery connected in a first polarity.

To illustrate the above statement, we turn first to FIG. 2 where the positive terminal of a first battery is connected in clamps 2,42 and the negative terminal of the first battery is connected between clamps 4,44. DPST 53, is, of course, in its closed position as also shown in FIG. 2.

With this connection at the left hand side, moveable arm 15 abuts contact 19 and moveable arm 17 abuts contact 23.

At the other end, the positive terminal of a second battery (or D.C. power source) is connected between clamps 6,46 and the negative terminal of the second battery is connected between clamps 8,48. With this connection, moveable arm 27 abuts contact 31 and moveable arm 29 abuts contact 35.

As can be seen, the charging circuit proceeds from the positive terminal of the first battery through moveable arm 15 to contact 19 through lead 38, contact 31, moveable arm 27 to the positive terminal of the second battery. The negative terminal of the first battery is connected, through moveable arm 17, contact 23, lead 40, contact 35, moveable arm 29, to the negative terminal of the second battery. Thus, the proper polarity is ensured Considering now a second example, illustrated in FIG. 3, the left hand side is connected as in FIG. 2. However, in this case, the negative terminal of the second battery is connected between clamps 6,46 while the positive terminal is connected between clamps 8,48. The charging circuit is now as follows:

The positive terminal of the first battery is connected, through moveable arm 15, contact 19, lead 38, contact 37 and moveable arm 29 to the positive terminal of the second battery. The negative terminal of the first battery is connected through moveable arm 17, contact 23, lead 40, contact 33, and moveable arm 27 to the negative terminal of the second battery. Thus, once again, correct polarity connection is provided.

It can be verified, by connecting either of the ends to either of the terminals, that correct polarity will always be provided with the arrangement.

Before a battery is disconnected, the DPST 53 is thrown into its open position whereupon actuating power for the solenoid will be disconnected. Accordingly, the solenoids will once again assume their central position so that battery 1 will be disconnected from battery 2. Thus, spark discharge will be avoided when the batteries are disconnected from the arrangement.

Figure 3:
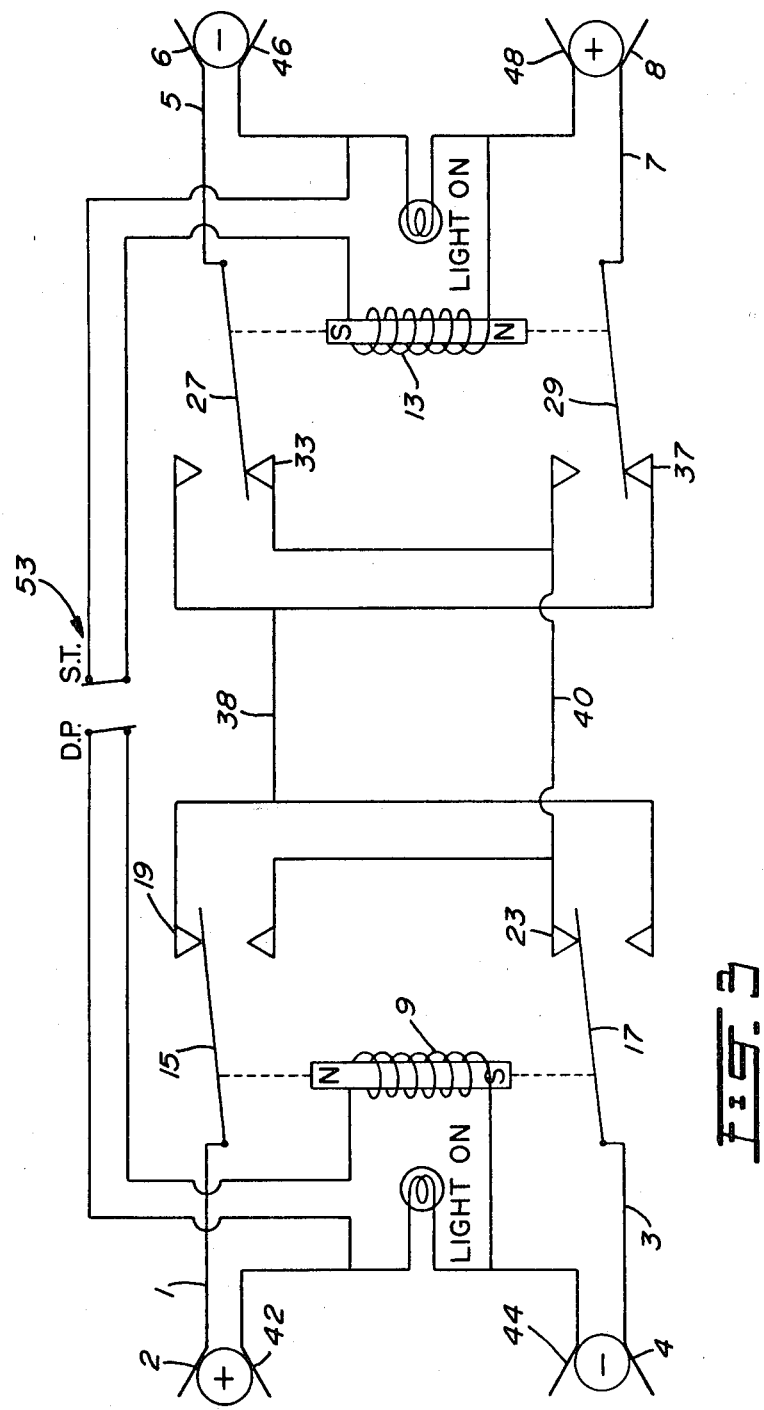
FIG. 3 shows the battery cable arrangement of FIG. 1 with the second battery connected in a second polarity.
Figure 4A:
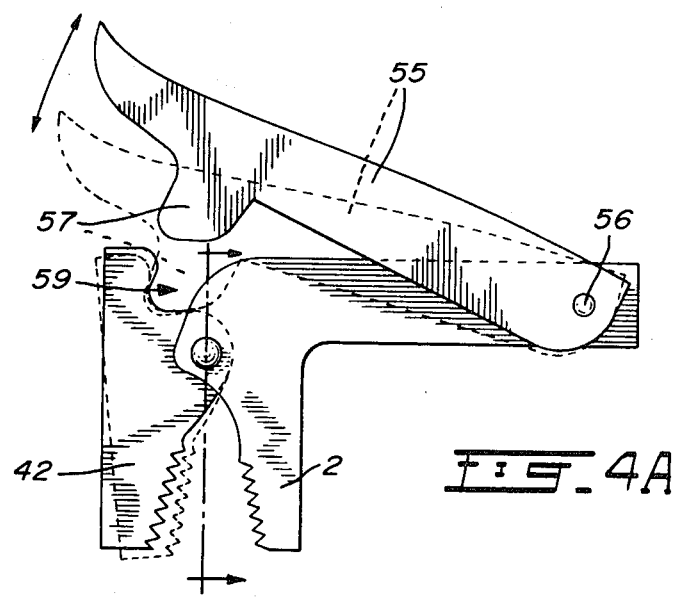
FIGS. 4a and 4b illustrate a particular clamping device which can be used in the battery cable arrangement of FIG. 1.
Figure 4B:
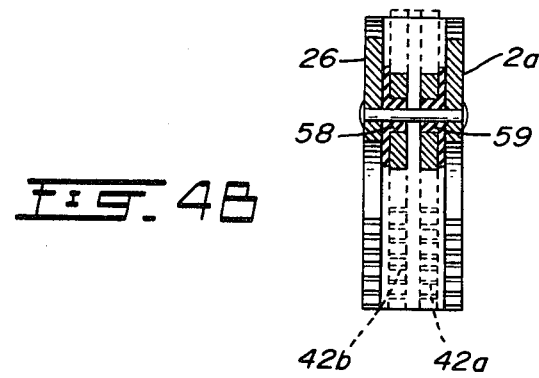

FIGS. 4a and 4b illustrate a particular clamping device which can be used in the circuits illustrated in FIGS. 1, 2 and 3. Referring to these Figures, the device includes a first half clamp 2 and a second half clamp 42 which is pivotable relative to 2. As seen in FIG. 4b, each half clamp member is a two-wall device (2a, 2b and 42a, 42b). Wall 42a is insulated from wall 2a by insulating member 59 which also provides a pivot for 42a. In the same way, insulating member 58 insulates 2b from 42b and provides a pivot point for 42b.

Separator arm 55 is mounted for pivoting about the point 56 and includes a protrusion 57. The protrusion 57 will move into the gap 59 between 2 and 42 at the top ends thereof to separate the top ends from each other and to thereby drive the bottom ends towards each other so that the clamping members will clamp onto a terminal when 55 is moved downwardly into a horizontal position. To remove the clamp from the terminal, it is merely necessary to once again lift the arm 55 upwardly whereupon 42 will be free to pivot away from 2.

As will be appreciated, the members 2 and 42 are made of a metallic conducting material whereas the member 55 is made of an insulating material. Thus, 2 and 42 will be electrically insulated from each other at all times.

Although the circuit has been described with solenoids for sensing polarity of connection, and DPDT switches, it will be appreciated that other means could be used for sensing the polarity of connection and solid state switching devices could be used in place of the DPDT switches. In fact, it may be possible to construct solid state devices which will both sense polarity and switch into complementary positions. All such devices would come within the scope of the present invention which contemplates the sensing of polarity connections and appropriate switching of the connections for correct polarities at both ends.

Although a specific embodiment has been disclosed, this was for the purpose of illustrating, but not limiting, the invention. Various modifications which would come readily to the mind of one skilled in the art are within the scope of the invention as defined in the appended claims.

I claim:

1. A battery cable jumper arrangement having a first pair of cables with means at the connecting ends of each cable of said first pair of cables to connect each cable end to a respective terminal of a source of D.C. power, and a second pair of cables with means at the connecting ends of each cable of said second pair of cables for connecting each said cable end to a respective terminal of a battery to be recharged;

characterized in that said arrangement includes;
    first means for sensing the polarity of connection of said first pair of cables at said source of power;
    second means for sensing the polarity of connection of said second pair of cables at said battery;
    switch means driven by said first means and said second means to automatically ensure correct polarity of connection between said power source and said battery.

2. An arrangement as defined in claim 1 wherein said switch means includes means for establishing a first charging path;

means for establishing a second charging path; and
means for establishing a third disconnected path.

3. An arrangement as defined in claim 2 wherein said switch means comprises first and second double pole double throw (DPDT) switches;
each DPDT switch having a first moveable arm and a second moveable arm;
the first moveable arm of said first DPDT switch being connected to the other end of one cable of said first pair of cables;
the second moveable arm of said first DPDT switch being connected to the other end of the other cable of said first pair of cables;
the first moveable arm of said second DPDT switch being connected to the other end of one cable of said second pair of cables; and
the second moveable arm of said second DPDT switch being connected to the other end of the other cable of said second pair of cables.

4. An arrangement as defined in claim 3 and wherein said DPDT switches further include;
a first set of contacts associated with said first moveable arm of said first DPDT;
a second set of contacts associated with the second moveable arm of said first DPDT;
a third set of contacts associated with the first moveable arm of said second DPDT; and
a fourth set of contacts associated with said second moveable arm of said second DPDT;
each set of contacts having a first contact and a second contact;
means for connecting all of the first contacts together; and
means for connecting all of the second contacts together.

5. An arrangement as defined in claim 3 wherein said means for sensing comprises a first three-position solenoid and a second three-position solenoid, said first three-position solenoid being associated with said first pair of cables and said first DPDT and said second three-position solenoid being associated with said second pair of cables and said second DPDT;
first actuating circuit means connecting said terminals of said source of power to actuating terminals of said first three-position solenoid; and
second actuating circuit means connecting the terminals of said battery to actuating terminals of said solenoid.

6. An arrangement as defined in claim 5 wherein said means for connecting comprises clamping means disposed at the connecting ends of said cables, each said clamping means including two clamping members one of said clamping members being moveable relative to the other one, said clamping members being electrically insulated from each other;
one of said clamping members being connected to a respective moveable arm of a respective DPDT;
the other one of said clamping members being connected to a respective actuating circuit means.

7. An arrangement as defined in claim 6 and further including switch means in series in each of said solenoid actuating circuit means;
whereby the source of power or battery is disconnected from said actuating means when said switch means is opened so that the switch means will establish the third disconnected path to disconnect the source of power or battery from the arrangement.

* * * * *